US008360878B2

(12) United States Patent
Petri

(10) Patent No.: US 8,360,878 B2
(45) Date of Patent: Jan. 29, 2013

(54) BIFURCATED ELECTRONIC DISPLAY GAMING SYSTEM, APPARATUS, AND METHOD FOR DISPLAYING A PRIMARY GAME WHEN CLOSED AND FOR DISPLAYING A SECONDARY GAME WHEN OPENED

(76) Inventor: Keith A. Petri, Wayne, IL (US)

( * ) Notice: Subject to any disclaimer, the term of this patent is extended or adjusted under 35 U.S.C. 154(b) by 119 days.

(21) Appl. No.: 12/925,332

(22) Filed: Oct. 19, 2010

(65) Prior Publication Data

US 2012/0094753 A1 Apr. 19, 2012

(51) Int. Cl.
*G06F 19/26* (2006.01)

(52) U.S. Cl. ............................... 463/30; 463/16; 463/20

(58) Field of Classification Search .................... 463/16, 463/20, 25, 30–32
See application file for complete search history.

(56) References Cited

U.S. PATENT DOCUMENTS

| | | | | |
|---|---|---|---|---|
| 5,128,662 | A * | 7/1992 | Failla | 345/1.3 |
| 5,673,170 | A * | 9/1997 | Register | 361/679.06 |
| 5,687,939 | A * | 11/1997 | Moscovitch | 248/122.1 |
| 5,949,643 | A * | 9/1999 | Batio | 361/679.27 |
| 6,135,884 | A | 10/2000 | Hedrick et al. | |
| 6,302,612 | B1 * | 10/2001 | Fowler et al. | 403/76 |
| 6,380,999 | B1 | 4/2002 | Tannas, Jr. | |
| 6,517,433 | B2 | 2/2003 | Loose et al. | |
| 7,042,528 | B2 | 5/2006 | Lester et al. | |
| 7,140,963 | B2 | 11/2006 | Kojima | |
| 7,161,651 | B2 | 1/2007 | Smovzh | |
| 7,219,893 | B2 | 5/2007 | Tanimura et al. | |
| 7,267,613 | B2 | 9/2007 | Cole | |
| 7,322,884 | B2 | 1/2008 | Emori et al. | |
| 7,329,181 | B2 | 2/2008 | Hoshino et al. | |
| 7,594,852 | B2 | 9/2009 | Rasmussen | |
| 7,633,744 | B2 * | 12/2009 | Kuhn | 361/679.04 |
| 2003/0087690 | A1 | 5/2003 | Loose et al. | |
| 2004/0053699 | A1 | 3/2004 | Rasmussen et al. | |
| 2004/0171423 | A1 * | 9/2004 | Silva et al. | 463/31 |
| 2004/0248647 | A1 | 12/2004 | Rothschild et al. | |
| 2004/0248648 | A1 * | 12/2004 | Rothschild et al. | 463/31 |
| 2008/0024388 | A1 | 1/2008 | Bruce | |
| 2008/0182652 | A1 | 7/2008 | Rasmussen et al. | |
| 2010/0105474 | A1 * | 4/2010 | Shimizu | 463/32 |
| 2010/0184510 | A1 * | 7/2010 | Nittou | 463/30 |
| 2010/0210354 | A1 * | 8/2010 | Burak et al. | 463/25 |

FOREIGN PATENT DOCUMENTS

JP 2010029373 A * 2/2010

* cited by examiner

*Primary Examiner* — Dmitry Suhol
*Assistant Examiner* — Jason Yen
(74) *Attorney, Agent, or Firm* — Meroni & Meroni, P.C.; Charles F. Meroni, Jr.; Christopher J. Scott

(57) ABSTRACT

A gaming system enables a gamer to sequentially play primary and secondary games. The gaming system comprises a primary gaming apparatus having a bifurcated electronic (e.g. liquid crystal or organic light emitting diode) display and a secondary gaming apparatus positioned behind the bifurcated electronic display relative to the gamer. The bifurcated electronic display enables (1) primary gaming when in a closed position, and (2) secondary gaming when in an open position. In other words, the secondary gaming apparatus is viewable when the bifurcated electronic display opens. The primary gaming apparatus effects or provides visually perceptible substantially seamless primary game imagery across the junction of the bifurcated electronic display. Various alternative embodiments and gaming methods are further disclosed as being supporting of the essential gaming system.

14 Claims, 12 Drawing Sheets

BIFURCATED ELECTRONIC DISPLAY GAMING SYSTEM, APPARATUS, AND METHOD FOR DISPLAYING A PRIMARY GAME WHEN CLOSED AND FOR DISPLAYING A SECONDARY GAME WHEN OPENED

BACKGROUND OF THE INVENTION

1. Field of the Invention

The present invention generally relates to an electronic gaming system. More particularly, the present invention relates to an electronic gaming system, apparatus and method for enabling primary and secondary gaming by way of a bifurcated or multi-faceted electronic display, which display physically moves to enable said gaming.

2. Brief Description of the Prior Art

U.S. Pat. No. 7,355,660 ('660 Patent), which issued to Ikeda, discloses a Liquid Crystal Display Device and Gaming Machine. The '660 Patent essentially describes a liquid crystal display device comprising a liquid crystal panel unit having a liquid crystal panel and a support member supporting the liquid crystal panel unit from a back side of the liquid crystal panel unit. The '660 Patent is reflective of a certain trend in gaming relating to so-called "transmissive reels" in which mechanical reels are positioned rearward of light-transmissive glass. Visual imagery is then projected or layered upon reel imagery to create a unique gaming experience.

The gaming system exemplified by the foregoing, however, suffers insofar as certain of the gaming imagery is poor in quality due to poor light transmission through liquid crystal display components, which results in diffused gaming imagery. In an attempt to improve upon the design by removing the light diffusive characteristics of the noted liquid crystal display components, and bearing in mind that aircraft cockpits have been outfitted with modified liquid crystal displays, the present invention was conceived. In this regard, it was conceived that by segmenting liquid crystal display (LCD) paneling, and displacing the separated LCD panels so as to reveal a clearer field of view of secondary gaming behind the display, gaming imagery could be better viewed.

It is further noted, however, that multi-segmented electronic displays are somewhat well-developed in analogous arts to the gaming industry. Some of the more pertinent art relating to electronic displays having multiple sections and the like are briefly described hereinafter. For example, U.S. Pat. No. 5,128,662 ('662 Patent), which issued to Failla, discloses a Collapsibly Segmented Display Screen for Computers or the Like. The '662 Patent describes a collapsible, storable information display screen for use with an electronic information processing device is disclosed which alleviates many of the problems associated with the smaller display screens. The display screen, when in use, is assembled in an electrically interconnected, mechanically stable, predetermined array, and when not in use, may be disassembled from said array and collapsed for compact storage.

U.S. Pat. No. 5,949,643 ('643 Patent), which issued to Batio, discloses a Portable Computer having Split Keyboard and Pivotal Display Screen Halves. The '643 Patent describes a retrofitting, folding, portable keyboard for a notebook computer consists of two, pivotally-hinged halves. The two halves are hinged so that may be assume a perfectly flat, horizontal position or, alternatively, a laterally raised and sloping configuration that provides an enhanced, ergonometric configuration to the user. Each half has its own set of keys and space bar.

The keyboard of the invention has its own pointing device that takes over the pointing function of the pointing device of the dedicated keyboard provided with the notebook computer. The portable, folding keyboard of the invention also has a joystick-adapter by which a conventional joystick may be operatively coupled to the notebook computer by which games may be played. Four, bottom, pivotal feet support the keyboard on and/or above the existing keyboard provided with the notebook computer. A carrying case is provided in which the folded-up keyboard may be stored and transported. Also provided is a dual split screen, where each half of the split screen is pivotally mounted for universal rotation.

U.S. Pat. No. 6,135,884 ('884 Patent), which issued to Hedrick et al., discloses a Gaming Machine having Secondary Display for Providing Video Content. The '884 Patent describes a machine having main and secondary displays. The secondary display is disposed apart from the primary display and is used for presenting primary, secondary, or even tertiary information. The main display is controlled electronically by a gaming machine controller, which main display presents the results of a play on the gaming machine. In the case of a slot machine, the main display may be the glass display through which the spinning reels of a game play are viewed. In a video poker gaming machine, the main display is usually a cathode ray tube ("CRT") which displays a video game image to the player and other information directly associated with the game play.

The secondary display may be provided at various locations on the gaming machine such as in a top glass portion of the gaming machine or a belly glass portion of the gaming machine, which belly glass portion is located below a main display portion of the gaming machine. The secondary display itself may be a liquid crystal display, a cathode ray tube, a field emission display, a plasma display, a digital micromirror device (DMD), etc. The secondary display is mounted on a secondary display support. The secondary display support is attached to the gaming machine chassis by a hinge in order to move the secondary display for access to maintenance.

U.S. Pat. No. 6,517,433 ('433 Patent), which issued to Loose et al., discloses a Reel Spinning Slot Machine with Superimposed Video Image. The '433 Patent describes a spinning reel slot machine which comprises a plurality of mechanical rotatable reels and a video display. In response to a wager, the reels are rotated and stopped to randomly place symbols on the reels in visual association with a display area.

The video display provides a video image superimposed upon the reels. The video image may be interactive with the reels and include such graphics as payout values, a pay table, pay lines, bonus game features, special effects, thematic scenery, and instructional information.

U.S. Pat. No. 7,140,963 ("963 Patent), which issued to Kojima, discloses a Gaming Machine with Reels and Display Device Displaying Characters Thereon, Reels Being Seen Through the Display Device. The '963 Patent describes a gaming machine in which the lower liquid crystal display is arranged in front of the reels which are mechanically driven and each reel is seen through each of the display windows of the lower liquid crystal display. And the character is dynamically displayed on the lower liquid crystal display and the reel operation of the reel is changed. At that time, the reel operation is stopped at the timing that the character crosses each of the display windows of the lower liquid crystal display.

United States Patent Application No. 2004/0053699, which was authored by Rasmussen et al., describes a method of converting a gaming machine between a machine for conducting a physical reel slot game and a machine for conducting a video game is disclosed. The gaming machine initially contains one of a physical slot reel assembly and a video display mounted to a mounting mechanism inside the machine. In the conversion method, the one of the slot reel assembly and the video display is removed from the gaming machine, and the other of the slot reel assembly and the video display is mounted to the mounting mechanism in its place. The mounting mechanism may, for example, be a display shelf. Other components may be modified according which of the slot reel assembly and the video display is installed in the gaming machine.

United States Patent Application No. 2004/0248647, which was authored by Rothschild et al., describes a gaming machine for conducting a wagering game includes a game display and an alterable display mechanism. The game display is for displaying the wagering game. The alterable display portrays a mechanical display member movable between a first position and a second position. The display member displays first and second information to a player when in the respective first and second positions. The information may be signage information that is free of random events and outcomes associated with the wagering game. The display member may, for example, be a flexible member scrolled about rollers, a rotatable panel, a rotatable set of panels akin to shutters, a "plate" rotatable in a fashion similar to a phonographic turntable with dividers to separate the sides, or a video representation of any of the foregoing.

United States Patent Application No. 2008/0024388, which was authored by Bruce, describes a display apparatus such as liquid crystal displays (LCD) or plasma displays or any other type of thin or flat display monitor apparatus having multiple display screens. The multiple display screens either consisting of double sided display screens, being slidingly engaged in a monitor housing having rails or being attached by a multiple axis pivot structure. The screens can be either controlled by a single control structure or can be independently controlled by multiple control structure where multiple users can work on each respective screen independently from one another.

United States Patent Application No. 2008/0182652, which was authored by Rasmussen et al., describes a computerized wagering game system includes a gaming module comprising a processor and gaming code which is operable when executed on the processor to present a wagering game on which monetary value can be wagered via at least one mechanical reel and a liquid crystal display (LCD). The liquid crystal display has at leas tone transparent portion through which the mechanical reel or reels can be observed. A blocking mechanism is operable to selectively limit visibility through the LCD transparent portion, such as for display of graphics on the transparent portion of the LCD display.

From a consideration of the foregoing, it will be noted that the prior art perceives a need for a gaming system or apparatus having both a primary gaming arrangement and a secondary gaming arrangement wherein the secondary gaming arrangement is viewable when the primary gaming arrangement opens to reveal same. In this last regard, the prior art perceives a need for a primary gaming arrangement having a bifurcated or multi-segmented electronic display when provides substantially seamless gaming imagery when in the closed position and enables secondary gaming imagery when in the open position.

SUMMARY OF THE INVENTION

To achieve these and other readily apparent objectives, the present invention essentially discloses a gaming system or apparatus for enabling a gamer to sequentially play primary and secondary games. The gaming system comprises a primary gaming apparatus or arrangement having a bifurcated or multi-segmented electronic (e.g. liquid crystal or organic light emitting diode) display. The separate panels of the electronic display provide substantially seamless gaming imagery across junction(s) between panels for enabling primary electronic gaming when the panels are in a closed position.

A secondary gaming apparatus or arrangement, however, is positioned behind the bifurcated or multi-segmented electronic display relative to the gamer. The multi-segmented electronic display enables secondary gaming when the panels thereof are in an open position by creating a secondary gaming field of view via the opened panels.

The process of displaying primary gaming imagery upon at least two display panels is achieved by displaying the same visually perceptible image on at least first and second display panels; and physically rotating the second display panel 180 degrees relative to the first display panel about an axis of rotation extending orthogonally through said second display panel so that the second display panel with image is upside down relative to the first display panel with image.

After physically rotating the second display panel, the visually perceptible image upon the second display panel is electronically rotated another 180 degrees about said axis of rotation relative to the second display panel so that the image is again made upright relative to the upside down second display panel. The first and second display panels may then be divided into first and second display panel sections.

The first display panel section of the first display panel may then be aligned with the second display panel section of the second display panel to provide a substantially seamless unitary image when the panel sections are in a closed position. When in an open position, secondary gaming arrangements or secondary visual effects may be seen via the field of view enabled by way of opened panels.

BRIEF DESCRIPTION OF THE DRAWINGS

Other features of my invention will become more evident from a consideration of the following brief descriptions of patent drawings.

DETAILED DESCRIPTION OF THE PREFERRED EMBODIMENT

Figure 1:
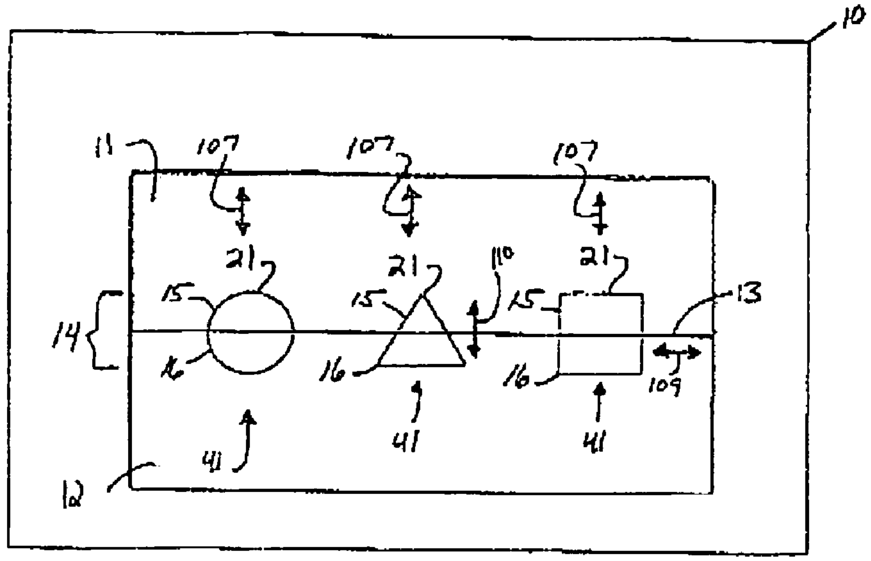
FIG. 1 is a frontal view of a bifurcated electronic gaming display showing relatively simple generic gaming imagery positioned across a junction between closed upper and lower display panels.

Referring now to the drawings with more specificity, the preferred embodiment of the present invention concerns a gaming system or apparatus comprising both a primary gaming arrangement and at least one secondary gaming arrangement, which primary and secondary gaming arrangements are juxtaposed adjacent one another and housed within a single gaming unit or cabinet as at 10. The gaming system or apparatus according to the present invention thus enables a user to play a primary game upon a first game display plane and at least one secondary game located behind the first game display plane relative to the user.

To achieve these gaming arrangements, and central to the present invention, is a bifurcated electronic display comprising a first (electronic) display panel as at 11, and a second (electronic) display panel as at 12. It is contemplated that the first and second display panels 11 and 12 may preferably be exemplified by either a liquid crystal display (LCD) type or of an organic light emitting diode (OLED) type. The first and second display panels 11 and 12 are configured so as to effect or provide visually perceptible, substantially seamless imagery as at 21 upon both the first display panel 11 and the second display panel 12 across the junction 13 therebetween as comparatively depicted in FIG. 1 versus FIG. 3 or FIG. 2 versus FIG. 4.

Figure 2:
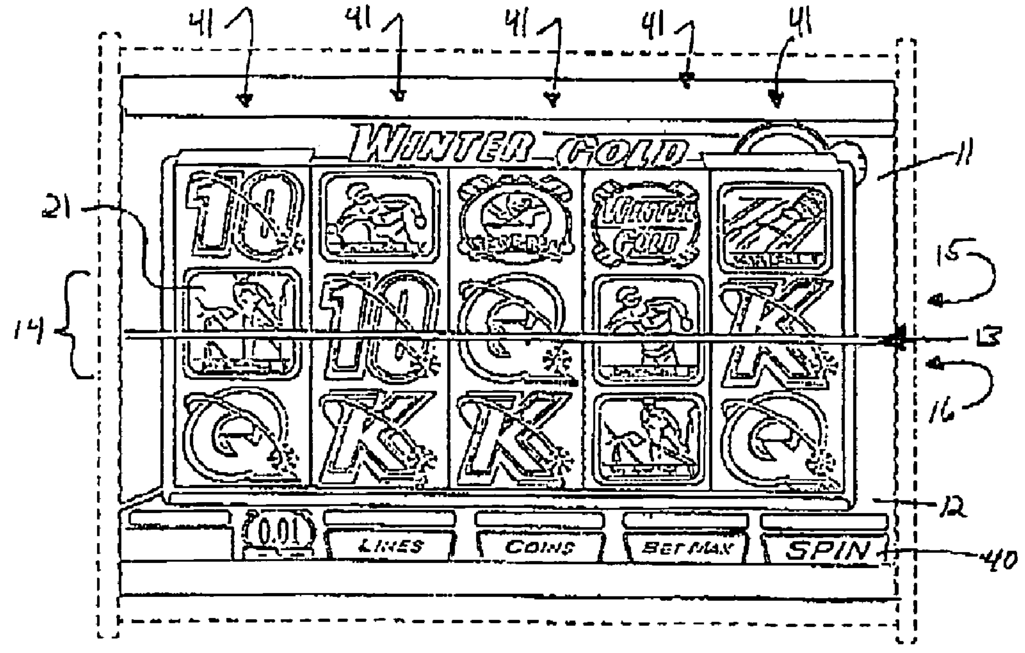
FIG. 2 is a frontal view of a bifurcated electronic gaming display showing relatively complex gaming imagery positioned across a junction between closed upper and lower display panels.

For example, referencing FIGS. 1 and 2, it will be seen that the gaming symbols 21 at section 14 are seemingly and substantially seamless across junction 13 insofar as the first display panel 11 comprises the upper sections 15 of certain symbols 21 and the second display panel 12 comprises the lower sections 16 of certain symbols 21. In other words, the upper and lower symbol sections 15 and 16 are matched together to form seemingly and substantially seamless symbols 21 at section 14.

Figure 3:
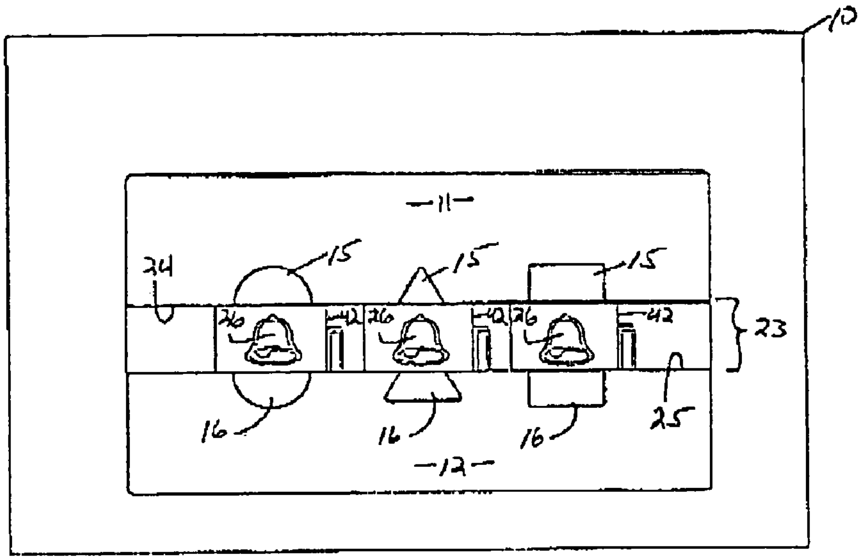
FIG. 3 is a frontal view of a bifurcated electronic gaming display showing relatively simple generic gaming imagery positioned across a junction between open upper and lower display panels.
Figure 4:
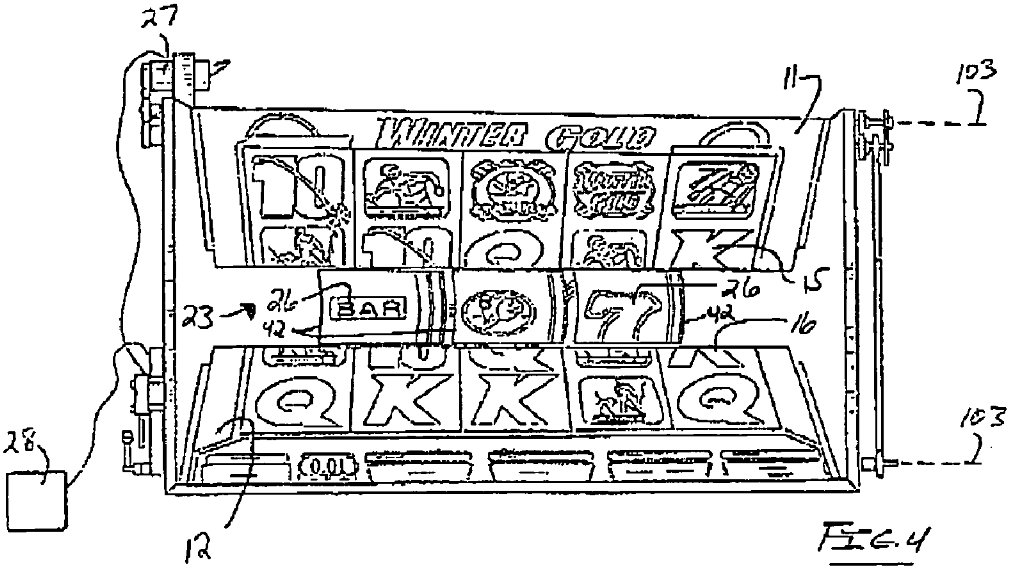
FIG. 4 is a frontal view of a bifurcated electronic gaming display showing relatively complex gaming imagery positioned across a junction between open upper and lower display panels.

Referencing FIGS. 3 and 4, it will be seen that the upper symbol sections 15 terminate upon first panel edging as at 24 and that lower symbol sections 16 terminate upon second panel edging as at 25. Together first panel edging 24 and second panel edging 25 form junction 13 when first display panel 11 and second display panel 12 are in a closed position as generally depicted in FIGS. 1 and 2. When panels 11 and 12 are in an open position as generally depicted in FIGS. 3 and 4, edging 24 and edging 25 define boundaries of a secondary gaming field of view or secondary game viewing gap as generally depicted and referenced at 23.

In order to effect visually perceptible substantially seamless imagery (as at 21) upon the first and second display panels 11 and 12 across the junction 13, it is contemplated that RGB/DVI input 17 from a video source 18 may be received by an analog/digital converter board 19 and LVDS output 20 directed from the board 19 to drive first and second (LCD) (full-sized) panels 11(*a*) and 12(*a*). In this regard it is noted that RGB/DVI is typically generated by a video adapter card installed in a mother board of a computer or central processing unit (not specifically illustrated).

Referencing FIGS. 13-18, it may be understood that the same visually perceptible image 21(*a*) may be simultaneously displayed upon the (full-sized) first and second panels 11(*a*) and 12(*a*), whereafter one of the panels 11(*a*) or 12(*a*) may be physically rotated 180 degrees (as at 100) about an axis of rotation (as at 101) extending orthogonally through the rotated panel 11(*a*) or 12(*a*). After physically rotating the panel 11(*a*) or 12(*a*) 180 degrees as at 100, the image 21(*a*) may be electronically rotated (e.g. via any number of software programs) about the axis of rotation referenced at 101. The panels 11(*a*) and 12(*a*) may then be re-sized, for example, by cutting both panels 11(*a*) and 12(*a*) into (half-sized) first and second display panels 11 and 12, which panels 11 and 12 may then be aligned so that the image sections 15 and 16 may form a visually perceptible, substantially seamless image across junction 13 as at 21.

It is contemplated that either or both of the panels 11/12 may be displaced from a normally closed position (as generally depicted in FIGS. 1, 2, 5, and 10) to an open position (as generally depicted in FIGS. 3, 4, 6, 7, 8, 9, 11, and 12) for revealing a secondary gaming arrangement as generally depicted and referenced at 22 in FIGS. 5-7, and 10-12. In addition to the noted figures, it will be seen from an inspection of FIGS. 3, 4, 8, and 9 that the secondary gaming arrangement has a secondary gaming display area or section 23 viewable via the displaced panel(s) 11 and/or 12.

Throughout the illustrations, the secondary gaming arrangement 22 has been illustrated as a state-of-the-art, three-reel gaming arrangement. Forward or anterior symbols 26 are viewable via the secondary gaming field of view 23 when either or both of the panels 11/12 are in an open position. Secondary gaming is thus enabled via the secondary gaming arrangement viewable when the panels 11/12 are in an open position. Notably, the secondary gaming arrangement 22 need not be defined by a multi-reel gaming arrangement as depicted for ease of understanding, but could conceivably be defined by a secondary electronic display or other gaming arrangement.

The gaming system or apparatus according to the present invention necessarily comprises certain display displacement means for displacing the first display panel 11 and/or the second display panel 12 to and from the closed position so as to enable secondary gaming. In this regard, it is contemplated that the display displacement means may comprise at least one motor-gear assembly as at 27, which motor-gear assembly 27 is in electrical communication with a signal source 28, which source may selectively send signals to the motor-gear assembly 27 for opening and closing the panels 11/12 as required. Conceivably, gaming results otherwise displayed upon the panels 11/12 and/or the secondary gaming arrangement may control or govern the motor-gear assembly 27 for enhancing the gaming experience.

As comparatively illustrated in FIGS. 4-9, it is contemplated that in a first alternative embodiment, both panels 11 and 12 may be rotated about axes of rotation as at 103 away from the viewer so as to open the secondary gaming field of view 23. In this gaming arrangement, the positioned placement of the secondary gaming arrangement necessary requires relatively more space between the primary gaming panels 11 and 12 and the anterior or forward portions 29 of the secondary gaming arrangement 22 so that the panels 11/12 do not contact or obstruct the secondary gaming arrangement 22 as the edging 24 and 25 moves toward the secondary gaming arrangement 22.

Figure 10:
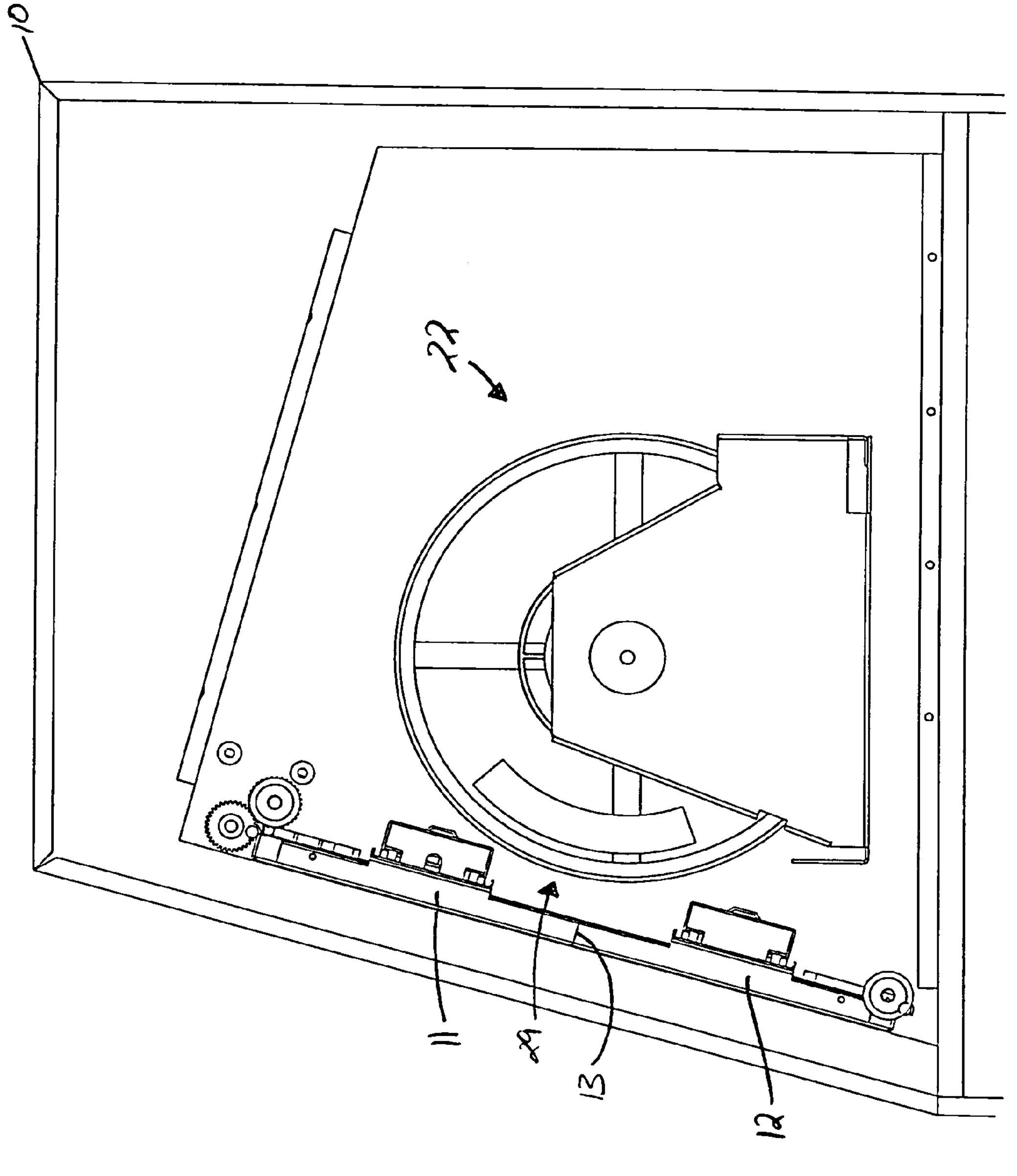
FIG. 10 is a side elevational view of a second alternative gaming apparatus according to the present invention with side panel removed to show upper and lower electronic gaming display panels in a closed position adjacent a reel apparatus.
Figure 11:
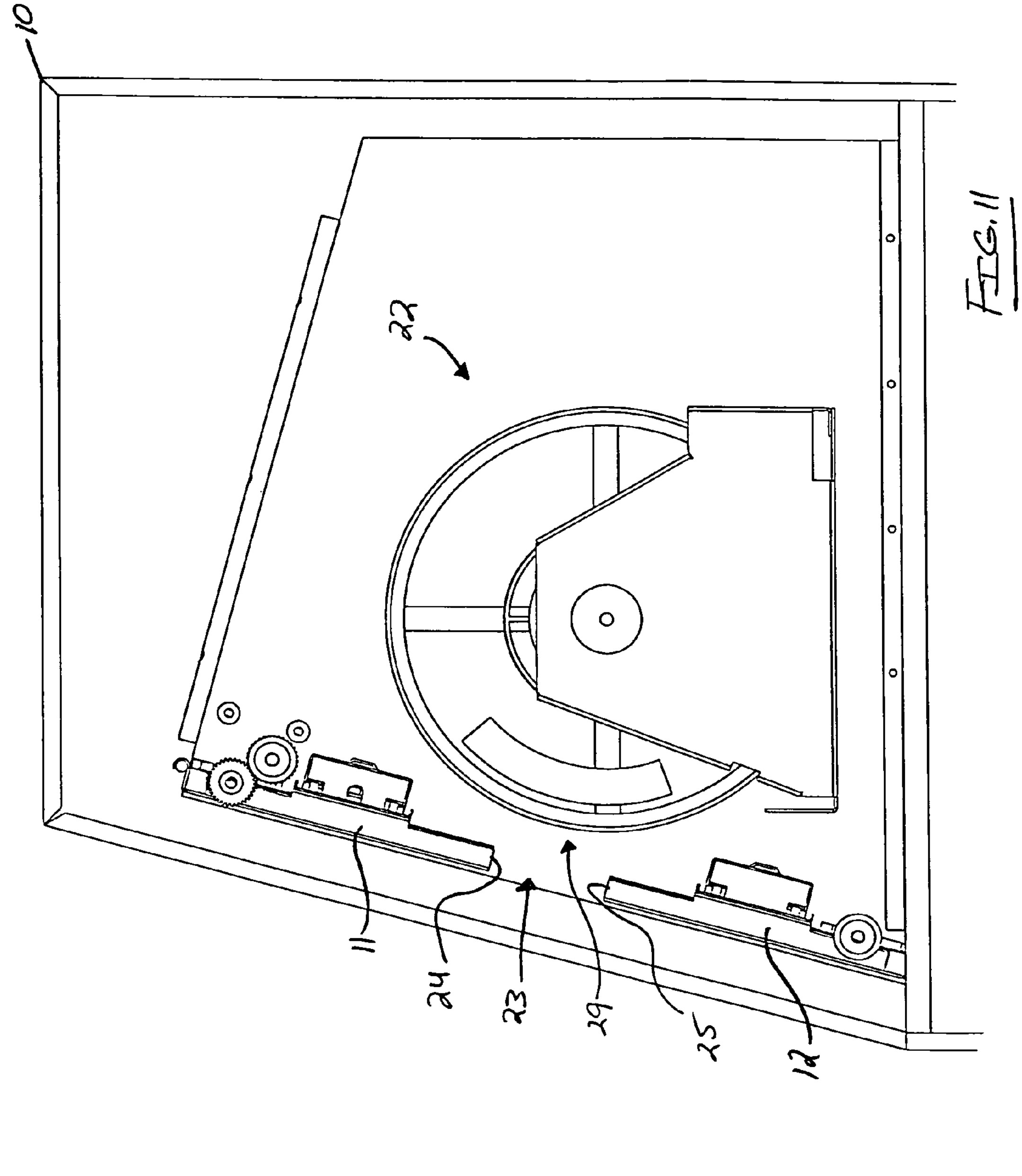
FIG. 11 is a side elevational view of a second alternative gaming apparatus according to the present invention with side panel removed to show upper and lower electronic gaming display panels in an open position adjacent a reel apparatus.
Figure 12:
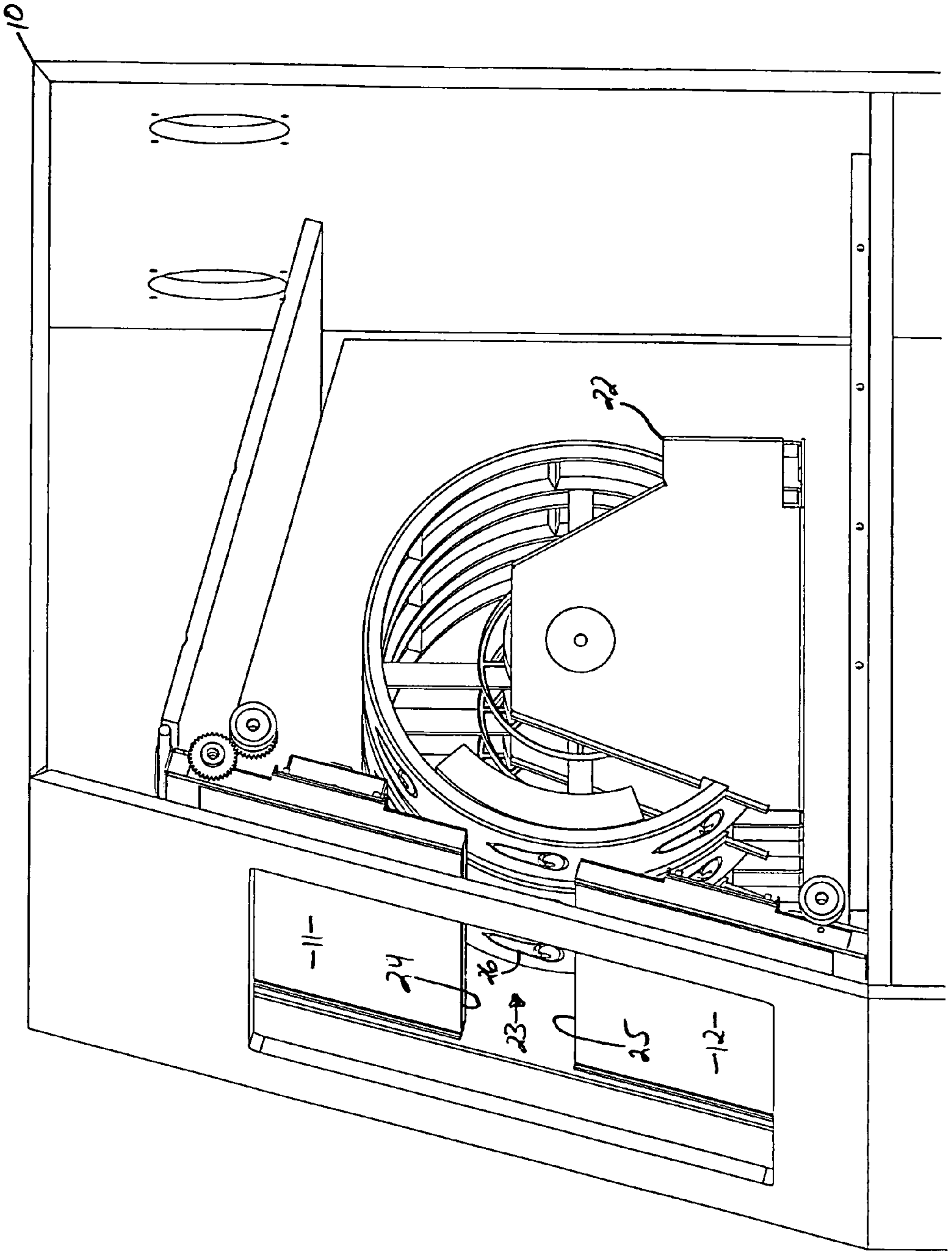
FIG. 12 is a perspective view of a second alternative gaming apparatus according to the present invention with side panel removed to show upper and lower electronic gaming display panels in an open position adjacent a reel apparatus.

As comparatively illustrated in FIGS. 10-12, it is contemplated that in a second alternative embodiment, both panels 11 and 12 may be translated away from one another in the same plane so as to open the secondary gaming field of view 23. In this gaming arrangement, the positioned placement of the secondary gaming arrangement 22 requires relatively less space between the primary gaming panels 11 and 12 and the anterior or forward portions 29 of the secondary gaming arrangement 22.

Figure 5:
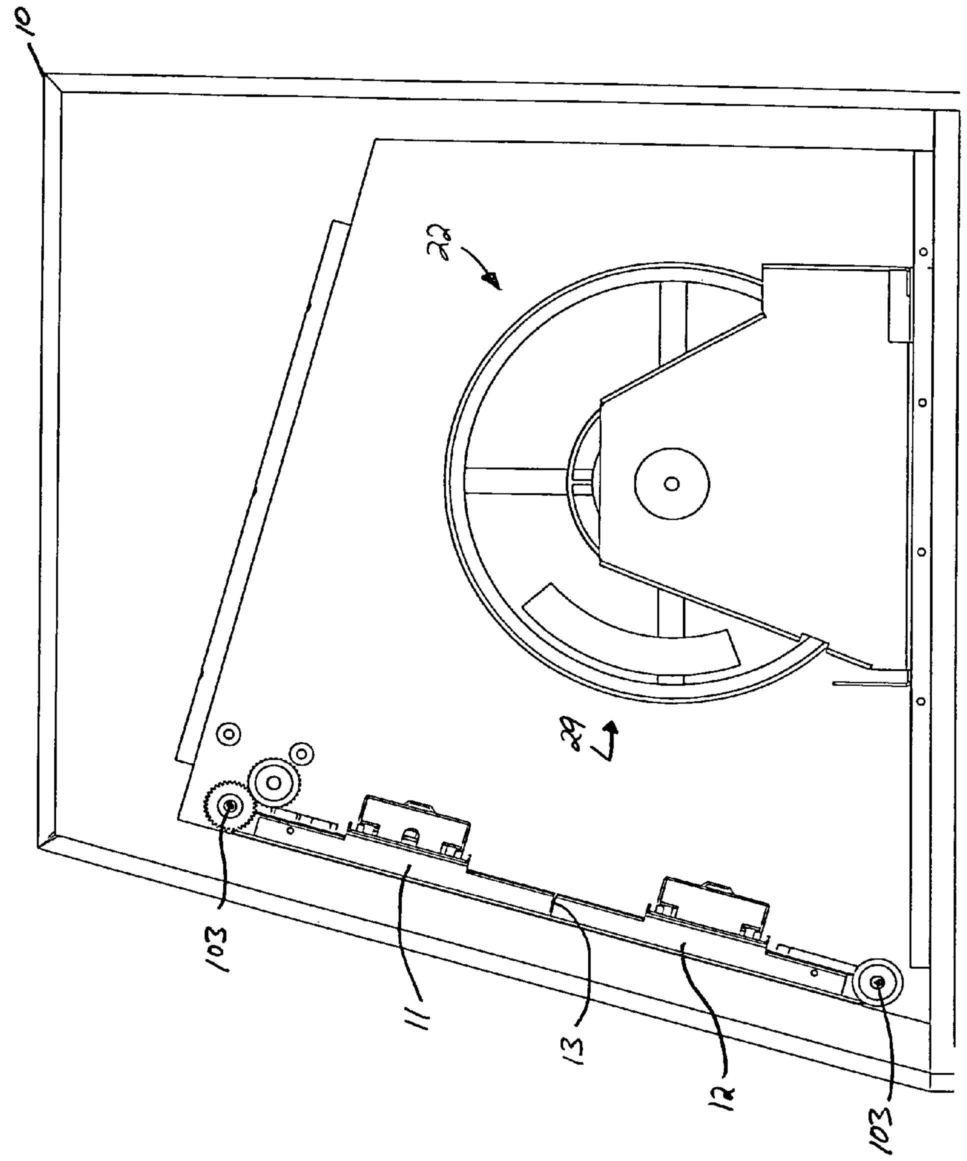
FIG. 5 is a side elevational view of a first alternative gaming apparatus according to the present invention with side panel removed to show upper and lower electronic gaming display panels in a closed position adjacent a reel apparatus.
Figure 6:
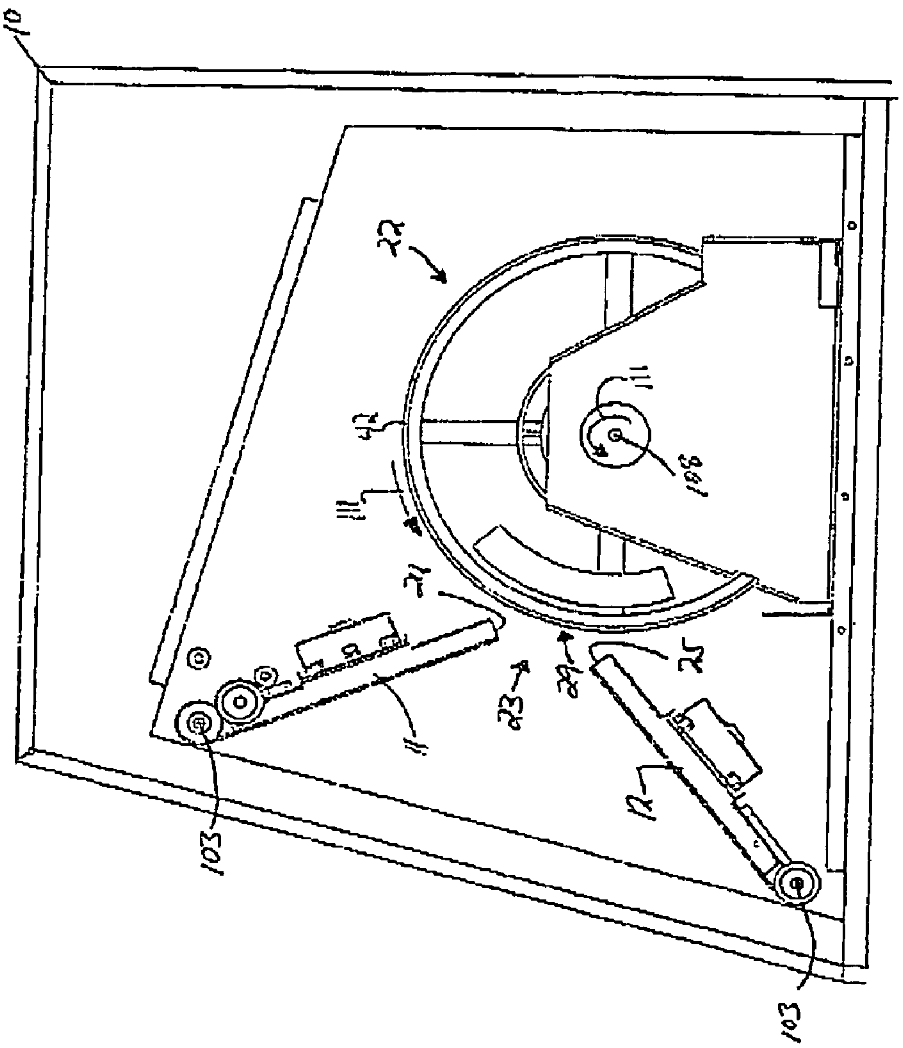
FIG. 6 is a side elevational view of a first alternative gaming apparatus according to the present invention with side panel removed to show upper and lower electronic gaming display panels in an open position adjacent a reel apparatus.
Figure 7:
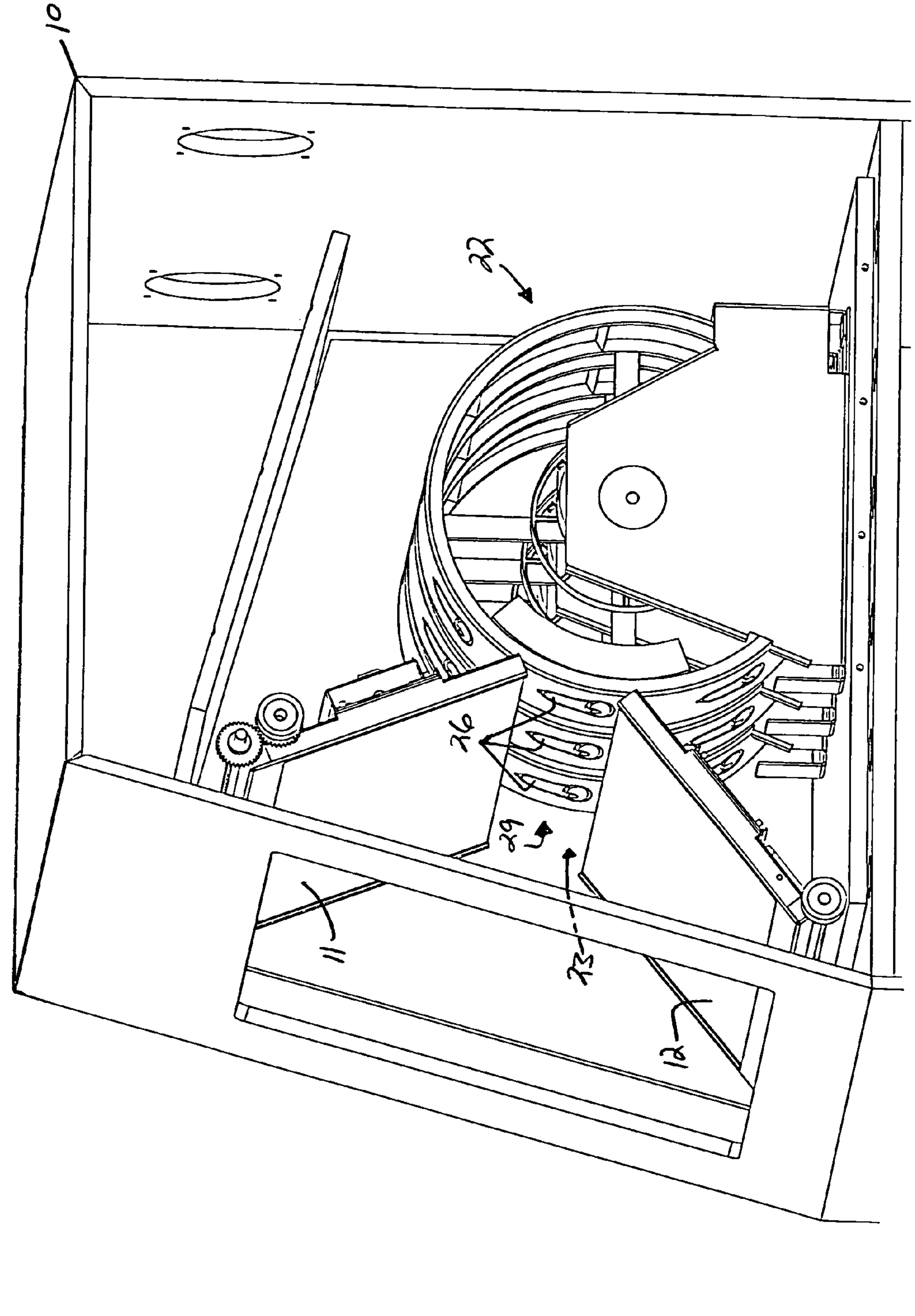
FIG. 7 is a perspective view of a first alternative gaming apparatus according to the present invention with side panel removed to show upper and lower electronic gaming display panels in an open position adjacent a reel apparatus.
Figure 8:
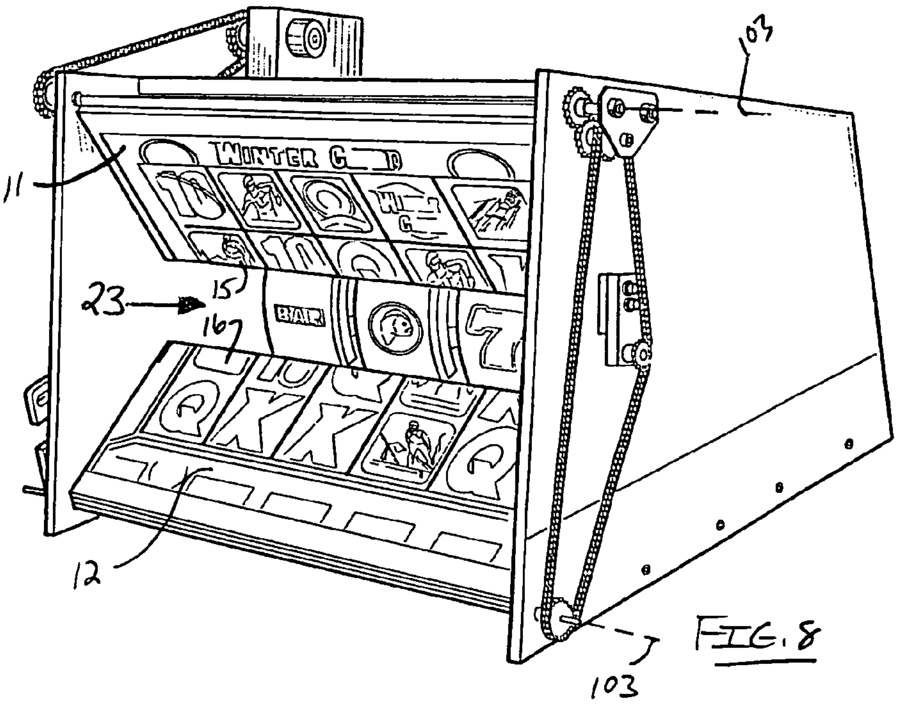
FIG. 8 is a right perspective view of a first alternative gaming apparatus according to the present invention showing upper and lower electronic gaming display panels in an open position.
Figure 9:
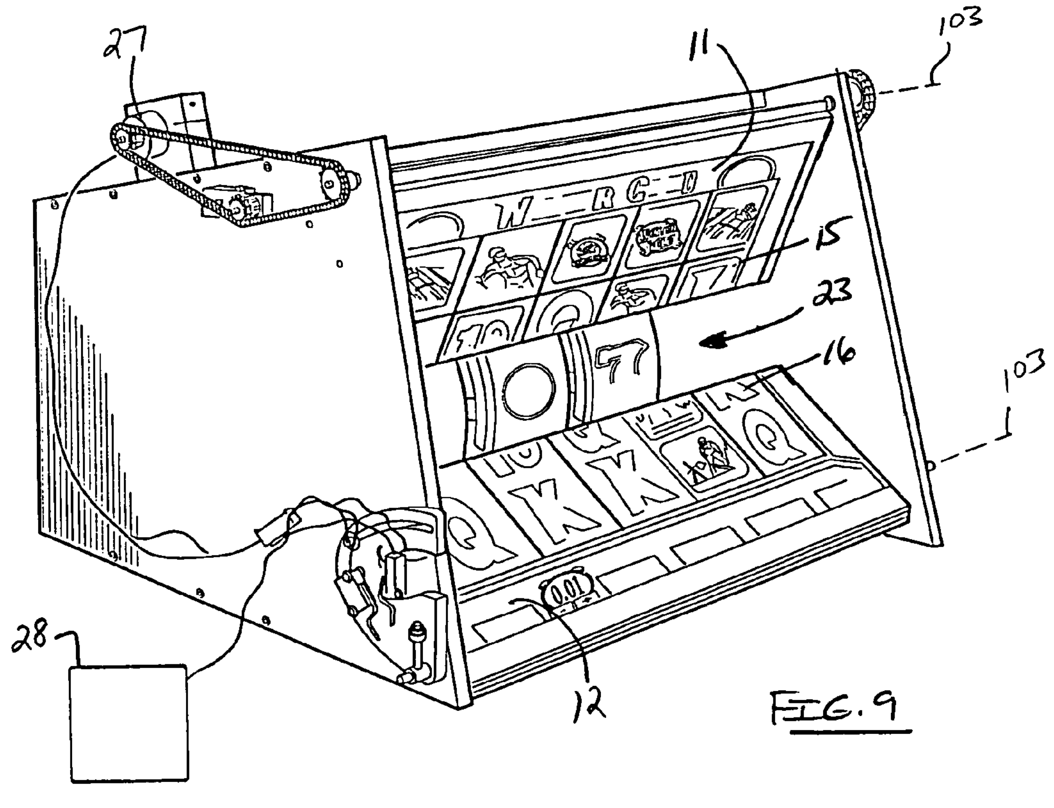
FIG. 9 is a left perspective view of a first alternative gaming apparatus according to the present invention showing upper and lower electronic gaming display panels in an open position.

In this last regard, the reader is invited to further compare FIG. 5 versus FIG. 10, and FIG. 6 versus FIG. 11. It will be seen from a comparative inspection of the noted figures that the secondary gaming arrangement 22 is more distant from panels 11 and 12 in FIGS. 5 and 6 relative to the distance between the secondary gaming arrangement 22 and panels 11/12 in FIGS. 10 and 11. The gaming experience may thus be tailored to either gaming arrangement.

For example, it is contemplated that the secondary gaming arrangement, if defined by a bifurcated panel arrangement substantially identical to the primary gaming arrangement, could very well be placed behind the primary gaming arrangement with a tertiary gaming arrangement (e.g. a multi-reel gaming arrangement) placed behind the secondary gaming arrangement such that two sets of bifurcated panels must open before the tertiary gaming arrangement is revealed via the field(s) of view opened by displacement of various display panels forward of the rearmost gaming arrangement.

Linear panel movement or shutter type panel displacement as generally illustrated or depicted in FIGS. 10-12 may thus better suit this type of gaming arrangement since less overall space is required for each "layer" of gaming within the gaming cabinet 10. Alternatively, panel rotation as generally illustrated or depicted in FIGS. 4-9 is arguably a more dynamic movement; additionally, more space is required to achieve the rotating movement all of which may be tracked visually by the user/viewer. The game designer could conceivably harness the rotating movement to enhance the overall gaming experience.

It will thus be understood that while the above descriptions contain much specificity, this specificity should not be construed as limitations on the scope of the invention, but rather as an exemplification of the invention. For example, it is contemplated that the gaming system or apparatus according to the present invention essentially comprises certain primary gaming means for enabling a user to primarily game, which primary gaming means comprise a bifurcated electronic display and means for effecting a visually perceptible primary game upon the bifurcated electronic display. The bifurcated electronic display has two display panels, which panels, when in a closed position enable primary gaming, but when displaced to an open position, enable secondary gaming via an opened secondary gaming field of view.

Certain display displacement means function to displace the first and second display panels intermediate the closed and open positions; and certain secondary gaming means enable a user/gamer to secondarily game. The secondary gaming means comprise an anterior gaming display or section as at 29 and certain means for effecting a visually perceptible secondary game upon the anterior gaming display, which means may be exemplified by symbols 26. As noted, the anterior gaming display 29 is visually perceptible when the bifurcated electronic display is in an open position.

While the preferred embodiment contemplates use of liquid crystal display panels, organic light emitting diode display panels or other similar electronic display panels could conceivably be utilized to achieve similar results. In this last regard, it should be recalled that first and second display panels have a junction. The primary gaming means effect or provide visually perceptible and substantially seamless imagery across the junction as may be exemplified by fluid symbolic movement (as would be the case with video slot type gaming) across the junction from the first display panel to the second display panel.

As has been noted, the display displacement means may displace the bifurcated electronic display intermediate the closed and open positions by either rotating both of the display panels or by translating both panels away from one another. While it is contemplated that in the preferred embodiment, both panels are displaced to the open position from the closed position, conceivably a single panel could be displaced so as to provide the secondary gaming field of view as at 23. only one panel may both be at least one display panel about an axis of rotation.

As earlier noted, the secondary gaming arrangement 22 has been illustrated (i.e. exemplified) as a state-of-the-art, three-reel gaming arrangement. Other gaming arrangements could conceivably replace the three-reel or multi-reel gaming arrangement and still be within the scope of the invention. For example, a second layer of electronic display could be positioned rearward of the bifurcated electronic display and provide a secondary gaming experience. Additionally, one or more layers of bifurcated electronic displays could conceivably provide secondary (and tertiary, etc.) gaming arrangements, the same being limited by space constraints.

In addition to the foregoing structural considerations, it is further believed that the inventive concepts discussed support certain new gaming and/or display methods and/or processes. In this regard, it is contemplated that the foregoing structures support a gaming method for enabling a user to play a primary game and at least one secondary game, which method may be said to essentially comprise the steps of: positioning primary and secondary gaming arrangements in first and second positions, which first and second positions are adjacent one another, and which primary gaming arrangement comprises at least two display panels.

Primary gaming imagery may then be displayed upon said display panels when in a closed position, whereafter at least one display panel may be displaced to an open position from the closed position thereby revealing the secondary gaming arrangement whereafter secondary gaming imagery may be displayed upon the secondary gaming arrangement and/or display. Panel displacement(s) could conceivably be governed by way of gaming results of either the primary gaming or secondary gaming arrangements.

Figure 13:
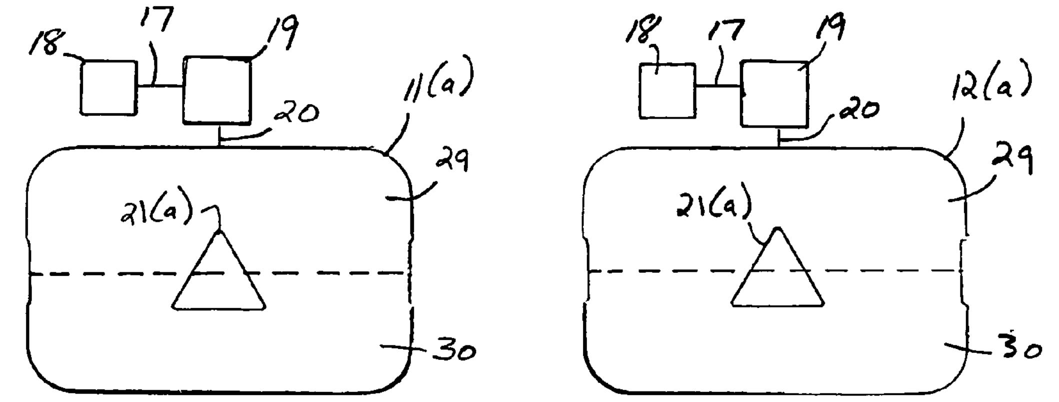
FIG. 13 is a first sequential diagrammatic type depiction of side-by-side liquid crystal display panel assemblies.
Figure 14:
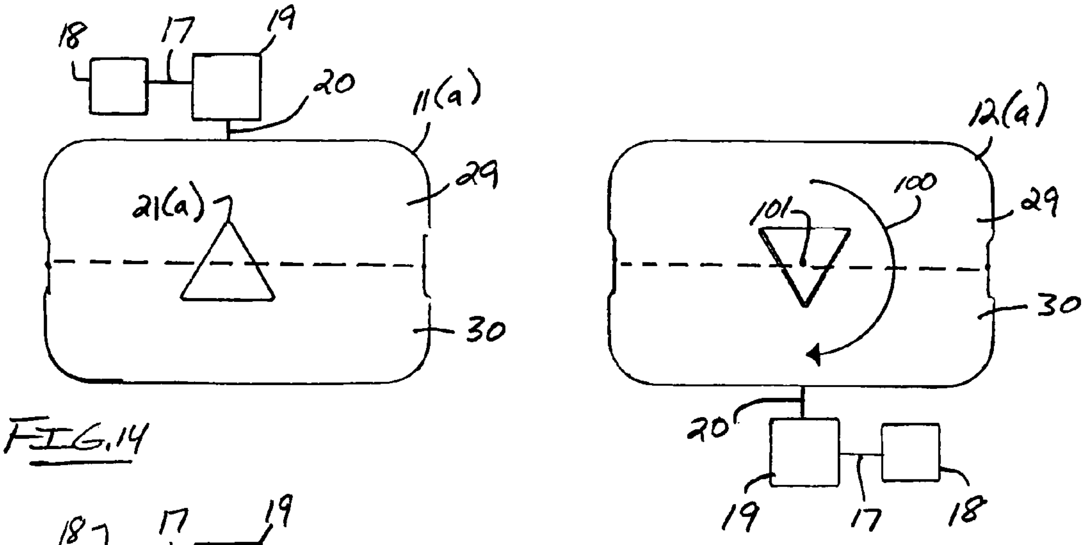
FIG. 14 is a second sequential diagrammatic type depiction of side-by-side liquid crystal display panel assemblies with the right liquid crystal display panel assembly being physically rotated 180 degrees relative to the left liquid crystal display panel assembly.

The step of displaying primary gaming imagery upon at least two display panels (as at 11(*a*) and 12(*a*)) may comprise the step of effecting visually perceptible substantially seamless imagery upon at least two display panels across a junction (as at 13) therebetween. The step of effecting visually perceptible substantially seamless imagery across the junction 13 may be said to represent a gaming display method comprising or supported by the steps of: displaying the same visually perceptible image (as at 21(*a*)) on at least first and second display panels 11(*a*) and 12(*a*); and (physically) rotating the second display panel 12(*a*) 180 degrees (as at 100) about an axis of rotation 101 extending orthogonally through said second display panel 12(*a*) as generally depicted in FIGS. 13 and 14.

Figure 15:
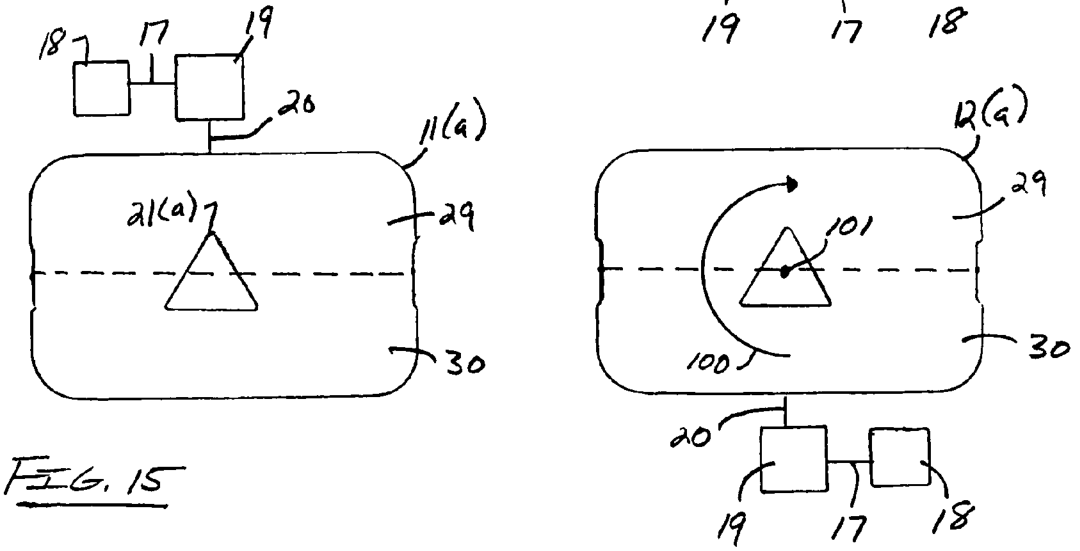
FIG. 15 is a third sequential diagrammatic type depiction of side-by-side liquid crystal display panel assemblies with the imagery upon the right liquid crystal display panel assembly being electronically rotated 180 degrees relative to the right liquid crystal display panel assembly.
Figure 16:
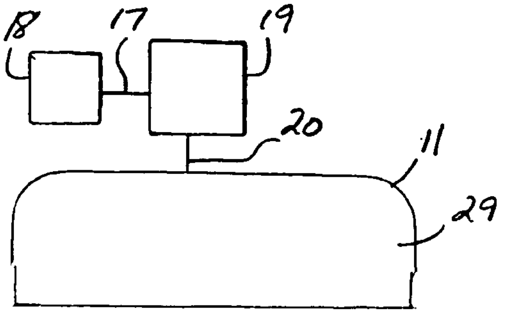
FIG. 16 is a fourth sequential diagrammatic type depiction of sectioned side-by-side liquid crystal display panel assemblies wherein the bottom half of the left liquid crystal display panel has been removed and the upper half of the right liquid crystal display panel has been removed.
Figure 17:
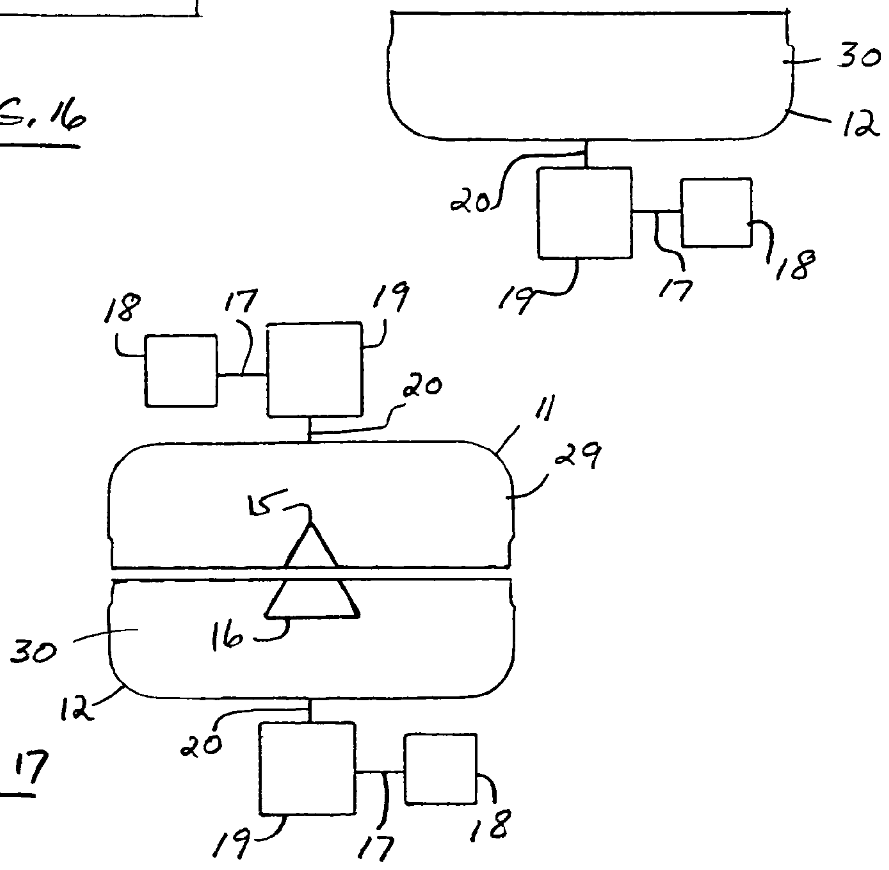
FIG. 17 is a fifth sequential diagrammatic type depiction of the sectioned liquid crystal display panel assemblies otherwise shown in FIG. 16 wherein the upper half of the left liquid crystal display panel is aligned with the lower half of the right liquid crystal display panel.
Figure 18:
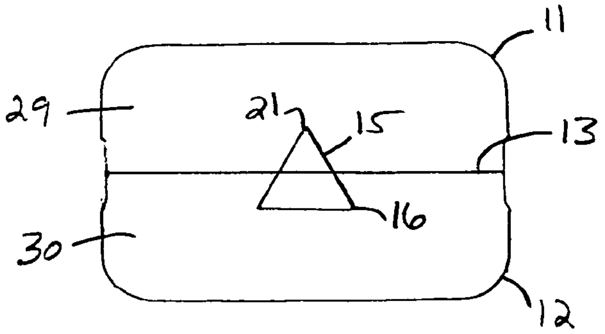
FIG. 18 is a sixth sequential diagrammatic type depiction of the sectioned liquid crystal display panel assemblies otherwise shown in FIG. 16 wherein the upper half of the left liquid crystal display panel is aligned with the lower half of the right liquid crystal display panel.

After physically rotating the second display panel 12(*a*), the visually perceptible image 21(*a*) may be electronically rotated another 180 degrees (as at 102) about said axis of rotation 101 as generally depicted in FIG. 15. The first and second display panels 11(*a*) and 12(*a*) may then be divided into at least a first display panel section (or upper section as at 29), and a second display panel section (or lower section as at 30) as generally depicted in FIG. 16. As depicted in FIG. 17, the first display panel section (or upper section 29) of the first display panel 11(*a*) may then be aligned with the second display panel section (or lower section 30) of the second display panel 12(*a*) to provide a substantially seamless image 21 comprising upper sections 15 and lower sections 16 as may be understood from a general consideration of FIG. 18.

The present invention is believed to essentially provide a gaming system, apparatus, and method for enabling a user to play primary and secondary games, and thus provides certain primary gaming means for enabling a user to play a primary game, and certain secondary gaming means for enabling a user to play a second game. The primary gaming means preferably comprise a bifurcated electronic display and means for effecting visually perceptible primary game imagery upon the bifurcated electronic display. The bifurcated electronic display has first and second display panels, each of which have junction edging, for example, as referenced at 24 and 25.

Certain display displacement means are further provided for displacing the first and second display panels to and from a closed position and an open position. The open position as may be seen from an inspection of FIGS. 3, 4, 6, 7, 8, 9, and 19, and alternatively shown in FIGS. 11 and 12, defines a secondary game viewing gap as generally referenced at 23. The secondary game viewing gap 23 may be defined by the junction edging of the first and second display panels, which junction edging (as at 24/25) together have a gap length as at 105 and define a gap width as at 106 when in the open position as more particularly shown in FIG. 19.

The secondary gaming means comprise a secondary gaming display and means for effecting visually perceptible secondary game imagery upon the secondary gaming display. The secondary game imagery preferably comprises a series of movable secondary game images as exemplified by symbols 26. The secondary game images 26 are alienable along the gap length 105 and sized and shaped such that the secondary game images 26 are viewable in stationary series within the gap width 106.

Figure 19:
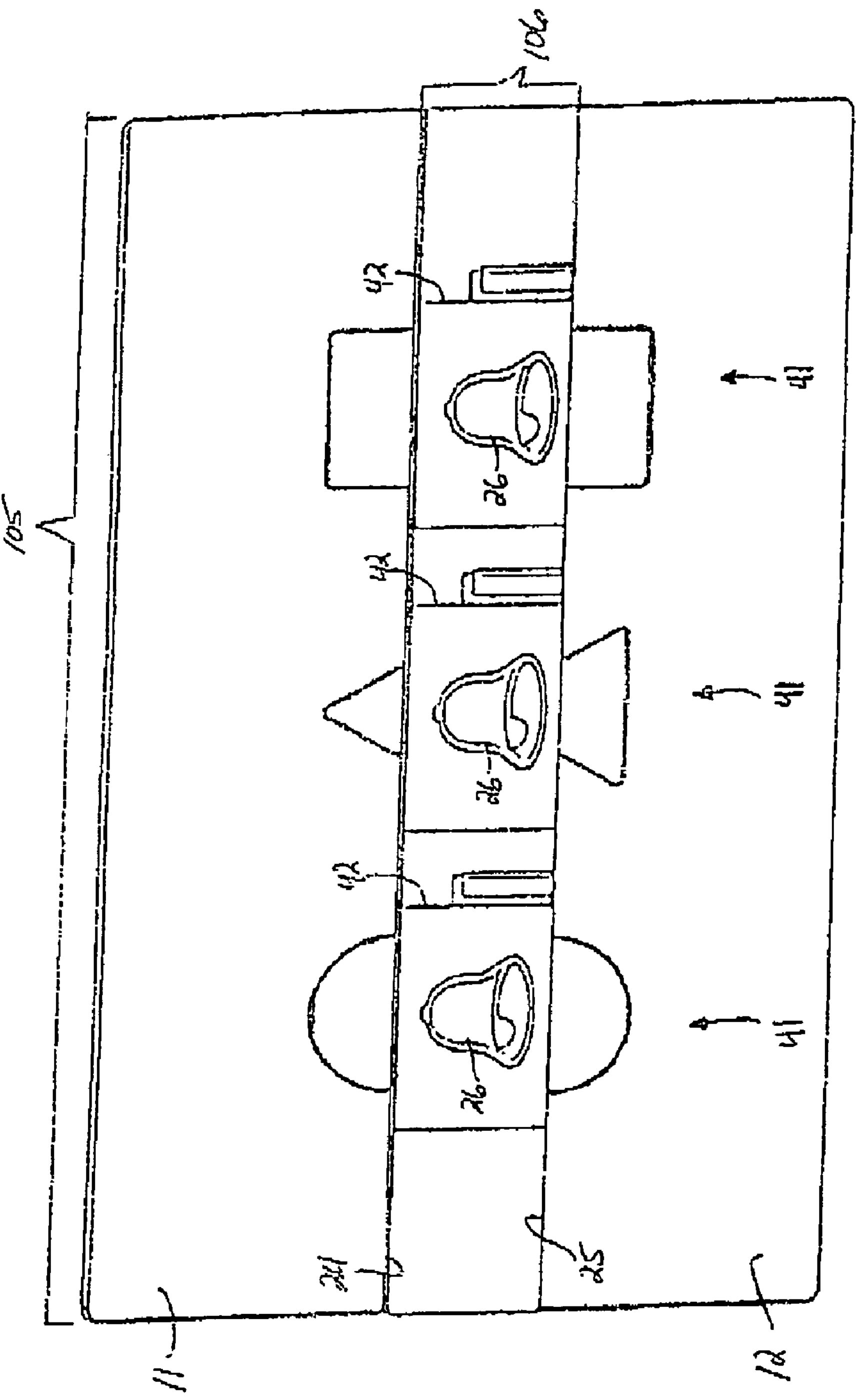
FIG. 19 is an enlarged frontal view of the bifurcated electronic gaming display otherwise shown in FIG. 3, enlarged to show in greater detail the relatively simple generic gaming imagery positioned across a junction between open upper and lower display panels.

In other words, given a typical slot machine scenario with a spin input mechanism as at 40, the various images upon the columns 41 or reels 42 of a reel mechanism (as at gaming arrangement 22) will typically spin such that vertical movement of the imagery will occur as at vectors 107. Such vertical movement is effected typically by rotating (as at 111) reels 42 about an axis of rotation as at 108, but may also be effected by electronically drive or governed image movement as would be the case upon panels electronic display panels 11 and 12. When movement stops, and the symbols 26 come to rest they are stationary within the gap 23 and aligned in series as generally depicted in FIGS. 3 and 19.

The junction edging 24 and 25 of the first and second display panels 11 and 12 define a junction as at 13, which junction 13 extends in a junction direction or orientation as at 109 when the first and second display panels are in the closed position. The primary gaming means effect visually perceptible primary game imagery of unitary appearance (i.e. the upper sections 15 match with the lower sections 16 across the junction 13 to form a singular image 21), which imagery extends in a second direction or orientation as at 110 across the junction 13, which second direction or orientation 110 is orthogonal to the junction orientation 109.

The display displacement means displace the bifurcated electronic display to and from the closed and open positions by preferably rotating at least one display panel (11 or 12) about an axis of rotation as at 103 such that the axis of rotation is parallel to the gap length 105 and the movable secondary game images (as at 26) are movable from first junction edging (e.g. edging 24) to second junction edging (e.g. edging 25) in an image movement direction or orientation (as at 107) orthogonal to the gap length 105.

Accordingly, although the invention has been described by reference to certain preferred embodiment(s) and certain gaming/display methodology, it is not intended that the novel arrangement and methods be limited thereby, but that modifications thereof are intended to be included as falling within the broad scope and spirit of the foregoing disclosures and the appended drawings.

I claim:

1. A gaming system for enabling a user to play primary and secondary games, the gaming system comprising:

primary gaming means for enabling a user to play a primary game, the primary gaming means comprising a bifurcated electronic display and means for effecting visually perceptible primary game imagery upon the bifurcated electronic display, the bifurcated electronic display having first and second display panels, the first and second display panels each having junction edging;

display displacement means for displacing the first and second display panels to and from a closed position and an open position, the open position defining a secondary game viewing gap, the secondary viewing gap being defined by the junction edging of the first and second display panels, the junction edging defining a gap length and a gap width when in the open position; and secondary gaming means for enabling a user to play a secondary game, the secondary gaming means comprising a secondary gaming display and means for effecting visually perceptible secondary game imagery upon the secondary gaming display, the secondary game imagery comprising a series of movable secondary game images, the second game images being alignable along the gap length and sized and shaped such that the secondary game images are viewable in stationary series within the gap width, wherein the display displacement means displace the bifurcated electronic display to and from the closed and open positions by rotating at least one display panel about an axis of rotation, the axis of rotation being parallel to the gap length, the movable secondary game images being movable from first junction edging to second junction edging in an image movement direction orthogonal to the gap length.

2. The gaming system of claim 1 wherein the junction edging of the first and second display panels define a junction extending in a junction direction when the first and second display panels are in the closed position, the primary gaming means effecting visually perceptible primary game imagery of unitary appearance extending in a second direction across the junction, the second direction being orthogonal to the junction direction.

3. The gaming system of claim 1 wherein game results govern the display displacement means for displacing the bifurcated electronic display to and from the closed and open positions.

4. A gaming apparatus for enabling a user to play a primary game and at least one secondary game, the gaming apparatus comprising:

primary gaming means for enabling a user to play a primary game, the primary gaming means comprising at least two display panels, each display panel having junction edging;

display displacement means for displacing at least one of the display panels to and from a closed position and an open position, the open position defining at least one secondary game viewing gap, each secondary viewing gap being defined by the junction edging of the display panels, the junction edging defining at least one gap length and at least one gap width when in the open position; and secondary gaming means for enabling a user to play a secondary game, the secondary gaming means comprising a secondary gaming display, the secondary gaming display being visually perceptible when at least one display panel is displaced to the open position, the secondary gaming display for displaying secondary game imagery, the secondary game imagery comprising a series of movable secondary game images, the secondary game images being alignable along each gap length and size and shaped such that the secondary game images are viewable in stationary series within each gap width, wherein the display displacement means displace at least one display panel to the open position by rotating at least one panel about an axis of rotation, the axis of rotation being parallel to each gap length, the movable secondary game images being movable from first junction edging to second junction edging in an image movement direction orthogonal to each gap length.

5. The gaming apparatus of claim 4 comprising at least one junction extending in a junction direction defined by junction edging of the at least two display panels when the first and second display panels are in the closed position, the primary gaming means effecting visually perceptible primary game imagery of unitary appearance extending in a second direction across at least one junction, the second direction being orthogonal to the junction direction.

6. The gaming apparatus of claim 4 wherein game results govern the display displacement means for displacing at least one display panel to and from the closed position.

7. A gaming method for enabling a user to play a primary game and at least one secondary game, the gaming method comprising the stops of:

positioning primary gaming means in a first closed panel position, the primary gaming means comprising a bifurcated electronic display and means for effecting visually perceptible primary game imagery upon the bifurcated electronic display, the bifurcated electronic display having first and second display panels, the first and second display panels each having junction edging;

displaying primary game imagery upon the first and second display panels of the primary gaming means while in the closed panel position; displacing a select display panel of the first and second display panels to an open panel position, the open panel position defining a secondary game viewing gap, the secondary viewing gap being defined by the junction edging of the first and second display panels, the junction edging defining a gap length and a gap width when in the open panel position;

revealing secondary gaming means by way of the displaced select display panel, the secondary gaming means comprising a secondary gaming display and means for effecting visually perceptible secondary game imagery upon the secondary gaming display, the secondary game imagery comprising a series of movable secondary game images; and displaying the secondary game images alignable along the gap length and sized and shaped such that the secondary game images are viewable in stationary series within the gap width via the open panel position, wherein the movable secondary game images being movable from first junction edging to second junction edging in an image movement direction orthogonal to each gap length.

8. The gaming method of claim 7 wherein the step of displaying primary game imagery comprises the step of effecting visually perceptible primary game imagery of unitary appearance across a junction, the junction extending in a junction direction when the first and second display panels are in the closed position, the primary game imagery of unitary appearance extending in a second direction orthogonal to the junction direction.

9. The gaming method of claim 8 wherein the step of effecting visually perceptible primary game imagery comprises the steps of: displaying a visually perceptible image on both a first display panel and a second display panel; rotating the second display panel 180 degrees relative to the first display panel about an axis of rotation extending orthogonally through said second display panel; rotating the visually perceptible image upon the second display panel 180 degrees relative to said axis of rotation; dividing the first and second display panels into at least first and second display sections; and aligning the first display panel section of the first display panel with the second display panel section of the second display panel.

10. The gaming method of claim 7 wherein the step of displacing at least one primary game display panel is defined by rotating said primary game display panel about an axis of rotation, the axis of rotation being parallel to the gap length.

11. The gaming method of claim 7 comprising the step of governing panel displacement via gaming results.

12. A gaming display method, the gaming display method comprising the steps of:

displaying an identical visually perceptible image on a first game display panel and a second game display panel, the first and second game display panels extending in a panel plane;

rotating the second game display panel 180 degrees about an axis of rotation extending orthogonally through the panel plane of the second game display panel; rotating the visually perceptible image within the panel plane of the second game display panel 180 degrees about said axis of rotation;

dividing each of the first and second game display panels into a first game display panel section and a second game display panel section via junction edging, the junction edging extending in a first direction; and aligning in a second direction the first game display panel section of the first game display panel with the second game display panel section of the second game display panel, the second direction being orthogonal to the first direction;

displacing at least one game display panel away from at least one other game display panel thereby revealing a secondary game display; and moving secondary game display imagery from first junction edging to second junction edging in an image movement direction defined by the second direction.

13. The gaming display method of claim 12 comprising the step of effecting visually perceptible game imagery of unitary appearance across a junction between first and second primary game display panels, the junction extending in the first direction, the primary game imagery of unitary appearance extending in the second direction.

14. The gaming display method of claim 12 comprising the step of governing panel displacement via gaming results.

* * * * *